(12) United States Patent
Miyazaki (10) Patent No.: US 8,844,698 B2
(45) Date of Patent: Sep. 30, 2014

(54) CENTRIFUGAL CLUTCH SYSTEM

(75) Inventor: Jun Miyazaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 536 days.

(21) Appl. No.: 13/190,483

(22) Filed: Jul. 26, 2011

(65) Prior Publication Data

US 2012/0024651 A1 Feb. 2, 2012

(30) Foreign Application Priority Data

Jul. 29, 2010 (JP) ................................. 2010-170540

(51) Int. Cl.
*F16D 43/10* (2006.01)
*F16D 13/52* (2006.01)
*F16D 13/14* (2006.01)

(52) U.S. Cl.
CPC ..................................... *F16D 43/10* (2013.01)
USPC ..... 192/70.23; 192/66.32; 192/96; 192/105 B (58) Field of Classification Search
USPC ......... 192/103 A, 105 B, 105 C, 105 R, 66.3, 192/66.32, 70.23, 96
See application file for complete search history.

(56) References Cited

U.S. PATENT DOCUMENTS 6,533,056 B1 * 3/2003 Maimone ................. 192/105 B

FOREIGN PATENT DOCUMENTS

| JP | 47-024843 U | 11/1972 |
| JP | 2009-068694 | 4/2009 |
| JP | 2010-060106 | 3/2010 |

OTHER PUBLICATIONS

Japanese Office Action for corresponding JP Application No. 2010-170540, Aug. 5, 2013.

* cited by examiner

*Primary Examiner* — Jacob S Scott
(74) *Attorney, Agent, or Firm* — Mori & Ward, LLP (57) ABSTRACT

A centrifugal clutch system includes a centrifugal weight, an outer member, an inner member, a first clutch plate, a second clutch plate, a bottom portion side pressure member, and an open side pressure member. The centrifugal weight is movable in a radial direction of the clutch system. The outer member is rotatably supported on a rotation axis and subjected to a driving force. The inner member is integrally and rotatably supported on the rotation axis. The first and second clutch plates are respectively supported in the outer and inner member. The bottom portion side pressure member thrusts each clutch plate to an open side of said outer member and releases the thrusting force by the movement of said centrifugal weight. The open side pressure member thrusts each clutch plate to a bottom portion of said outer member. The open side pressure member is supported on said inner member.

19 Claims, 8 Drawing Sheets

CENTRIFUGAL CLUTCH SYSTEM

CROSS-REFERENCE TO RELATED APPLICATIONS

The present application claims priority under 35 U.S.C. §119 to Japanese Patent Application No. 2010-170540, filed Jul. 29, 2010. The contents of this application are incorporated herein by reference in their entirety.

BACKGROUND OF THE INVENTION

1. Field of the Invention

The present invention relates to a centrifugal clutch system.

2. Discussion of the Background

Previously, in a clutch system having a centrifugal weight which is capable of thrusting each clutch plate in a clutch axial direction at a bottom portion of an outer member (driving side member) which is concentrically formed with a rotation axis and formed in a cylindrical shape with a bottom, which thrusts and frictionally engages each clutch plate by the movement of the centrifugal weight to an outer periphery side of the clutch of the centrifugal weight, there is a bearing member which supports a member receiving thrusting force from a centrifugal weight in the open side of the outer member (for example, see Japanese Patent Application Publication (KOKAI) No. 2009-68694).

SUMMARY OF THE INVENTION

According to one aspect of the present invention, a centrifugal clutch system includes a centrifugal weight, an outer member, an inner member, a first clutch plate, a second clutch plate, a bottom portion side pressure member, and an open side pressure member. The centrifugal weight is movable in a radial direction of the clutch system. The outer member has an axis coaxial with a rotation axis and has a cylindrical shape with a bottom. The outer member is relatively rotatably supported on the rotation axis and is constantly subjected to a driving force from a driving source. The inner member is integrally and rotatably supported on the rotation axis in an inner periphery side of said outer member. The first clutch plate is integrally and rotatably supported in the inner periphery side of said outer member. The second clutch plate is integrally and rotatably supported in an outer periphery side of said inner member. The bottom portion side pressure member is arranged in the inner periphery side as well as said bottom portion side of said outer member and sandwiches said centrifugal weight between the space to said bottom portion of said outer member, simultaneously, thrusts each clutch plate to the open side of said outer member and releases the thrusting force by the movement of said centrifugal weight in the radial direction of the clutch system. The open side pressure member is arranged in the inner periphery sides as well as the open side of said outer member and thrusts each clutch plate to said bottom portion of said outer member by being subjected to a thrusting force from said centrifugal weight. The open side pressure member is supported on said inner member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

According to one embodiment of this invention, in a clutch system 1, 51 having a function as a centrifugal clutch which switches torque transmission wherein each clutch plate 6 is thrust in the clutch axial direction or releases the thrusting force by the movement of a centrifugal weight 33 to a radial direction of the clutch, the clutch system has an outer member 4 which is concentrically formed with a rotation axis 2 and formed in a cylindrical shape with a bottom, at the same time, which is relatively and rotatably supported on the rotation axis 2 and constantly receives driving force from a driving source; an inner member 5 integrally and rotatably supported on the rotation axis 2 in the inner periphery side of the outer member 4; a first clutch plate 6a integrally and rotatably supported in the inner periphery side of the outer member 4, a second clutch plate 6b integrally and rotatably supported in the outer periphery side of the inner member 5; a bottom portion side pressure member 7, 52 which is arranged in the inner periphery side as well as the bottom portion 4a side of the outer member 4 and sandwiches the centrifugal weight 33 between the space to the bottom portion 4a of the outer member 4, simultaneously, thrusts each clutch plate 6 to the open side of the outer member 4 or releases the thrusting force by the movement of a centrifugal weight 33 to a radial direction of the clutch; an open side pressure member 8 which is arranged in the inner periphery sides well as the open side of the outer member 4 and thrusts each clutch plate 6 to the bottom portion 4a of the outer member 4 by receiving a thrusting force from the centrifugal weight 33, the open side pressure member 8 is supported on the inner member 5.

According to the embodiment, due to the fact that the open side pressure member subjected to the thrust load from the centrifugal weight is supported on the inner member, the outer member and then the clutch system can reduce the bulk and can be downsized.

In the above-described structure, preferably, a move limiting portion 15b abutting on the bottom portion 4a in the clutch axial direction is equipped in order to control the movement of the outer member 4 itself to the bottom portion 4a side, a thrust bearing 34 is arranged between the move limiting portion 15b and the bottom portion 4a.

According to the embodiment, due to a reaction force generated when the centrifugal weight thrusts the bottom portion side pressure member supported on the inner member, the outer member is subjected to a load in the clutch axial direction. However, due to the fact that the thrust bearing subjected to a load allows the outer member and the position limit portion to relatively rotate, the load can be efficiently subjected.

In the above-described structure, preferably, a sprocket 25 for an auxiliary drive is arranged between the move limiting portion 15b and the bottom portion 4a.

According to the embodiment, the contact surface of the thrust bearing can be secured by using the side of the sprocket.

Preferably, a biasing member 53 biasing a bottom portion side pressure member 52 to the bottom portion 4a is equipped, in the structure, and the biasing member 53 is arranged between a plurality of the centrifugal weights 33 which are lined in the circumferential direction of clutch.

According to the embodiment, the clutch system can be further downsized by downsizing the biasing member.

In the above-described structure, preferably, a biasing member 28 biasing the bottom portion side pressure member 7 to the bottom portion 4a is equipped; the biasing member 28 is arranged between the centrifugal weight 33 and the hub portion 5a of the inner member 5 in the radial direction of clutch.

According to the embodiment, the biasing member can efficiently be arranged between the centrifugal weight and the hub portion. Simultaneously the clutch capacity can be secured without reducing the numbers of centrifugal weight.

In the above-described structure, preferably, a clutch spring 36 biasing the open side pressure member 8 to the bottom portion 4a side is equipped.

According to the embodiment, when the open side pressure member is moved to the open side of the outer member by being subjected to the thrusting force from the centrifugal weight, each clutch plate can be sandwiched by each pressure member due to the elastic force of the clutch spring.

<The First Embodiment<

Hereinafter, the embodiments of the present invention will be explained with reference to the drawings.

Figure 1:
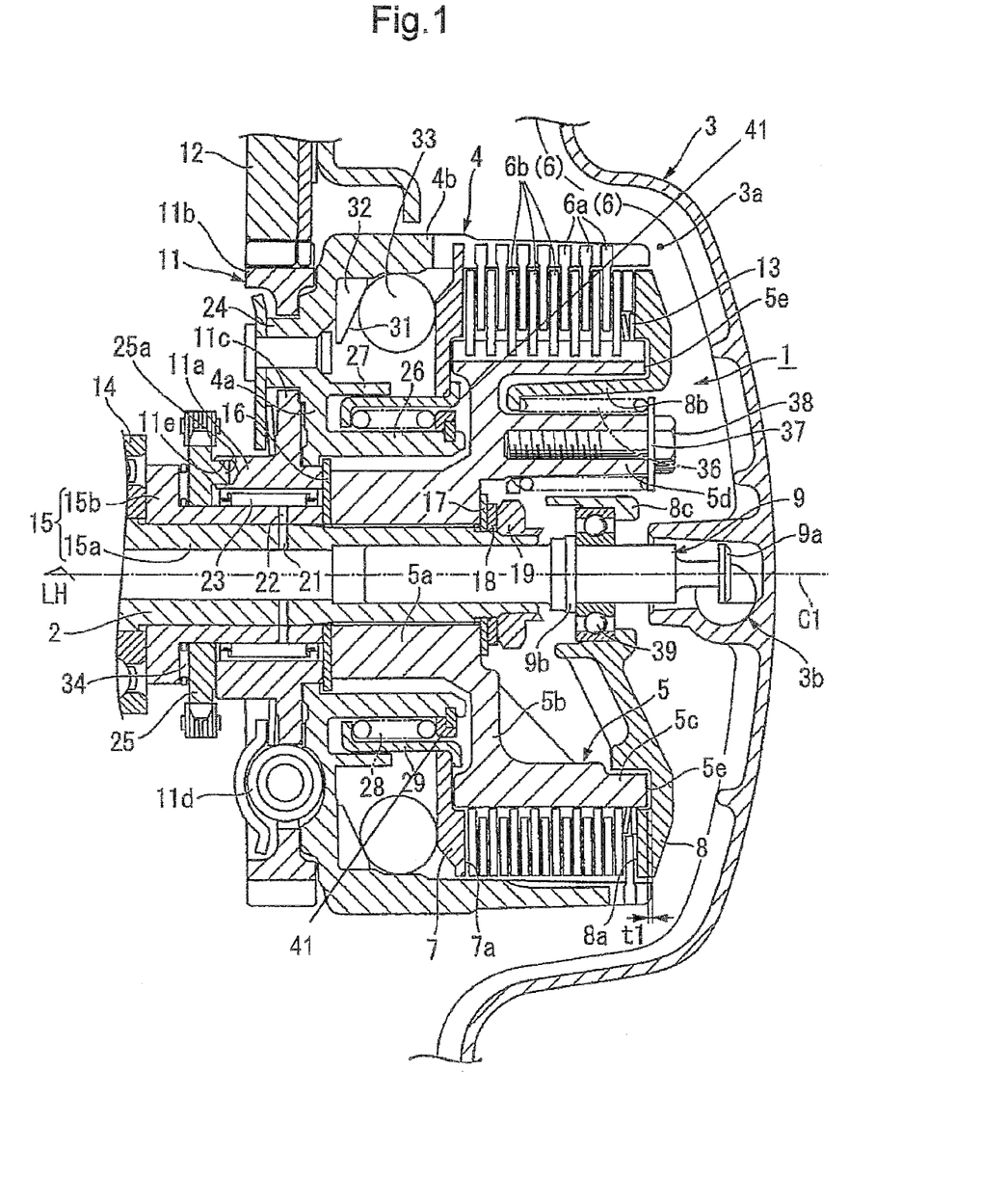
FIG. 1 is a cross sectional view along the axial direction, which shows a connection state of the multiple disc clutch according to the first embodiment of the present invention.

In an engine unit which is a power source for straddle type vehicles such as motorcycles, the multiple disc clutch 1 shown in FIG. 1 is concentrically arranged on an end portion of a main shaft 2 of the transmission. The multiple disc clutch 1 switches the torque transmission between a crank shaft (not shown) as a driving source and the main shaft 2, and is arranged inside a clutch chamber 3a (inside an oil chamber) of the one side of an engine case 3.

A multiple disc clutch 1 and the main shaft 2 are arranged so that the axial direction (hereinafter, called as the clutch axial direction) is along the left and right direction of the body (the width direction of the vehicle). Moreover, a sign C1 in the drawings shows a rotation center axis of the multiple disc clutch 1 (and the main shaft 2); an arrow LH in the drawings shows the left side of a vehicle respectively. In this embodiment, multiple disc clutch 1 is arranged on the right end portion of the main shaft 2. In other words, the right side of the axial direction of the multiple disc clutches 1 is corresponding to the outer side of the width direction of the vehicle, the left side of the axial direction of the multiple disc clutch 1 is corresponding to the inner side of the width direction of the vehicle. Hereinafter, an axial direction of the multiple disc clutches 1 is called as the clutch axial direction, a circumferential direction is called as the circumferential direction of clutch, and a radial direction is called as a radial direction of clutch.

The multiple disc clutch 1 has a function as a manual clutch connecting and disconnecting the power transmission in response to the operation of the clutch operator such as a clutch lever, in addition, and has a function as a centrifugal clutch connecting and disconnecting the power transmission in response to the rotational speed of a clutch outer 4 (driving source).

The multiple disc clutch 1 has the clutch outer 4 which is concentrically formed with the main shaft 2 and formed in a cylindrical shape with a bottom, simultaneously, is relatively and rotatably supported on the main shaft 2, and constantly transmitting the rotative power to the crank shaft; a clutch inner 5 which is concentrically arranged on the inner periphery side of the clutch outer 4, simultaneously, is integrally and rotatably supported on the main shaft 2; a plurality of clutch plates 6 layered in the clutch axial direction between the clutch outer 4 and the clutch inner 5; a bottom side pressure plate 7 which is concentrically arranged on the inner periphery side and the bottom portion 4a side of the clutch outer 4 and thrusting each clutch plate 6 layered (hereinafter, sometimes called as a group of clutch plates 6) to the right side, an open side pressure plate 8 which is concentrically arranged on the inner periphery side of the clutch outer 4 and the open side and thrusting the group of clutch plates 6 to the left side; a lifter rod 9 which is engaged with the release structure 3b interlocked with the clutch operator and releases the thrusting force generated by the open side pressure plate 8 to the group of clutch plates 6.

The clutch outer 4 integrally has the discoid bottom portion 4a and a cylindrical outer peripheral portion 4b standing up on the right side from the outer peripheral rim of the bottom portion 4a. A primary driven gear 11 enabling the power transmission to the crank shaft is concentrically as well as integrally and rotatably installed on the left side of the bottom portion 4a.

A number of engaging grooves along the axis C1 are engraved on the outer peripheral portion 4b. A number of engaging pawls projected on the outer periphery of the thing (Hereinafter, called as a clutch disc 6a) supported on the clutch outer 4 in each clutch plate 6 are respectively engaged with each engaging groove. Therefore, each clutch disc 6a becomes integrally rotatable and displaceable with the clutch outer 4 in the clutch axial direction. Furthermore, numerals 12 in the drawings shows a primary driving gear which is integrally and rotatably provided with the crank shaft is engaged with a primary driven gear 11.

On the other hand, clutch inner 5 integrally has the hub portion 5a spline fitting on the outer periphery of the main shaft 2; a flange portion 5b formed on the outer periphery of the right end portion of the hub portion 5a, a cylindrical portion 5c standing up on the furthermore right side than the outer peripheral rim of the flange portion 5b.

The cylindrical portion 5c is arranged at predetermined intervals on the inner periphery side of the outer peripheral portion 4b of the clutch outer 4.

A number of engaging grooves along the axis C1 are engraved on the cylindrical portion 5c. A number of engaging pawls projected on the inner periphery of the thing (Hereinafter, called as a clutch disc 6b) supported on the clutch inner 5 in each clutch plate 6 are respectively engaged with on each engaging groove. Therefore, each clutch disc 6b becomes integrally rotatable and displaceable with the clutch inner 5 in the clutch axial direction.

Furthermore, each clutch disc 6*a* and each clutch disc 6*b* are formed in a discoid shape with a central hole penetrating the cylindrical portion 5*c* of the clutch inner 5, and are layered alternately in the clutch axial direction. The clutch disc 6*a* formed with friction materials sticked on both faces of the base plate, the clutch disc 6*b* is made of a single metallic sheet.

The open side pressure plate 8 has a right thrust surface 8*a* abutting on the right side surface of the group of clutch plates 6, the bottom side pressure plate 7 has a left thrust surface 7*a* abutting on the left side surface of the group of clutch plates 6. In addition, belleville spring 13 for preventing from juddering is arranged at a predetermined position on the inner periphery side of the rightmost one of the group of clutch plates 6.

Each clutch disc 6*a* and each clutch disc 6*b* are nipped and compressed in the clutch axial direction and frictionally engaged with each other by the thrusting force from the pressure plate 7 and the pressure plate 8. Therefore, the clutch is in a connection state wherein the torque can be transmitted between the clutch outer 4 and the clutch inner 5. Meanwhile, releasing the frictional engagement leads the clutch to a disconnection state wherein the torque transmission is interrupted.

The main shaft 2 is formed in a hollow state; the inside thereof is used for an oil passage of engine oil. In addition, the numeral 14 in the drawings shows the radial ball bearing wherein the journal portion on the right side of the middle part of the main shaft 2 is supported on the bearing portion of the crank case.

The collar member 15 inserted by the main shaft 2 is arranged at a predetermined position on the right lateral of the bearing 14. The collar member 15 integrally has a flange portion 15*b* on the left edge portion of a collar body 15*a*. The right side surface of the inner race of the bearing 14 abuts on the left side surface of the flange portion 15*b*. The left end of the hub portion 5*a* of the clutch inner 5 abuts on the on the right end of the collar body 15*a* through the plain washer 16.

A plain washer 17 installed on the right end portion of the main shaft 2, a lock washer 18, and a lock nut 19 are orderly arranged from the hub portion 5*a* side on the right lateral of the hub portion 5*a*. The inner race of the bearing 14 is limited the movement to the left side against the main shaft 2, with fastening the lock nut 19, the collar member 15, the hub portion 5*a*, and each washer 16, 17, 18 are integrally fixed by fastening between the lock nut 19 and the inner race of the bearing 14.

The outer diameter of the hub portion 5*a* is larger than the outer diameter of the collar body 15*a*, the outer diameter of the plain washer 16 is set so as to be larger than the outer diameter of the hub portion 5*a*. The right end of the collar body 15*a* abuts on the left side surface of the inner periphery side of the plain washer 16. An oil hole 22 corresponding to an oil hole 21 provided on the main shaft 2 is formed on the right side portion of the collar body 15*a*. Oil inside the main shaft 2 is supplied to a radial needle bearing 23 installed on the outer periphery of the collar body 15*a* through each oil hole 21 and oil hole 22. The hub portion 11*a* of the primary driven gear 11 is rotatably supported on the outer periphery of the collar body 15*a* through the needle bearing 23.

The primary driven gear 11 has the hub portion 11*a*, a gear teeth portion 11*b* engaged with the primary driving gear 12, a spoke portion 11*c* bridged between the hub portion 11*a* and the gear teeth portion 11*b*. The bottom portion 4*a* of the clutch outer 4 is adjacently arranged on the right side of the primary driven gear 11. A boss portion 24 integrally and rotatably engaged with the spoke portion 11*c* is projected on the left side surface of the bottom portion 4*a*.

A damper 11*d* which enable the gear teeth portion 11*b* side and the hub portion 11*a* side elastically and relatively rotatable is provided on the spoke portion 11*c*. For example, a drive sprocket 25 for driving the oil pump is provided between the hub portion 11*a* and the flange portion 15*b* on the left side thereof. In addition, the right side portion of the hub portion 11*a* of the primary driven gear 11 penetratingly supports the center portion of the bottom portion 4*a* of the clutch outer 4, so that the hub portion 11*a* can act as the hub portion of the clutch outer 4.

The drive sprocket 25 forms a larger diameter than the hub portion 11*a* and the flange portion 15*b*, is rotatably supported on the outer periphery of the left side portion of the collar body 15*a*. The right side surface of the drive sprocket 25 abuts on the left end surface of the hub portion 11*a*, the left side surface abuts on the drive sprocket 25 abuts on the right side surface of the flange portion 15*b* through a thrust roller bearing 34. A convex portion 25*a* which gets into a concave portion 11*e* formed on the left end of the hub portion 11*a* is formed on the right side surface of the drive sprocket 25. Fitting the concave portion 11*e* and the convex portion 25*a* makes the drive sprocket 25 rotatable with the primary driven gear 11 and the clutch outer 4.

An inner cylinder potion 26 surrounding the outer periphery side of the hub portion 5*a* of the clutch inner 5 and an outer cylinder portion 27 surrounding furthermore the outer periphery side of the inner cylinder potion 26 are provided so as to stand on the respective right sides on the right side surface of the bottom portion 4*a* of the clutch outer 4. The standing height of the outer cylinder portion 27 is substantially half of the standing height of the inner cylinder potion 26. A nip and compression coil spring 28 giving the bottom side pressure plate 7 a biasing force to the left side in the space between the inner cylinder portion 26, and the outer cylinder portion 27, the engaging member 29 engaging the spring 28 with the bottom side pressure plate 7 is arranged.

The bottom side pressure plate 7 forms a discoid shape with a central hole, the left thrust surface 7*a* against the left side surface of the group of clutch plates 6 is formed on the outer periphery side.

The right edge portion of the cylindrical engaging member 29 abuts on from the right side on the inner periphery portion of the bottom side pressure plate 7, the left edge portion of the spring 28 arranged on the inner periphery side abuts on from the right side on the left end portion of the cylindrical engaging member 29.

The right end portion of the spring 28 abuts on a retainer 41 fixed of the outer periphery of the right end portion of the inner cylinder potion 26.

By the elastic force of the spring 28, the bottom side pressure plate 7 is biased to the left side (the opposite side of the group of clutch plates 6) against the clutch outer 4. Due to the fact that the outer peripheral portion of the bottom side pressure plate 7 is engaged with the outer peripheral portion 4*b* of the clutch outer 4 as same as the clutch disc 6*a*, the bottom side pressure plate 7 is integrally rotatable against the clutch outer 4 as well as displaceable in the clutch axial direction.

On a corner portion comprising the outer periphery side of the bottom portion 4*a* of the clutch outer 4 and the left side of the outer peripheral portion 4*b*, a guide member 32 is fixedly installed, which forms an inclined surface 31 inclined so as to be positioned on the further right side as it goes to the outer periphery side. In the inner periphery side as well as the bottom portion 4*a* side of the clutch outer 4, a plurality of centrifugal weight 33 is arranged at a predetermined position so as to be lined at even intervals in the circumferential direction of clutch in the space surrounded by the outer peripheral portion 4b, the inner cylinder potion 26, the bottom portion 4a and the guide member 32, and the bottom side pressure plate 7.

Figure 2:
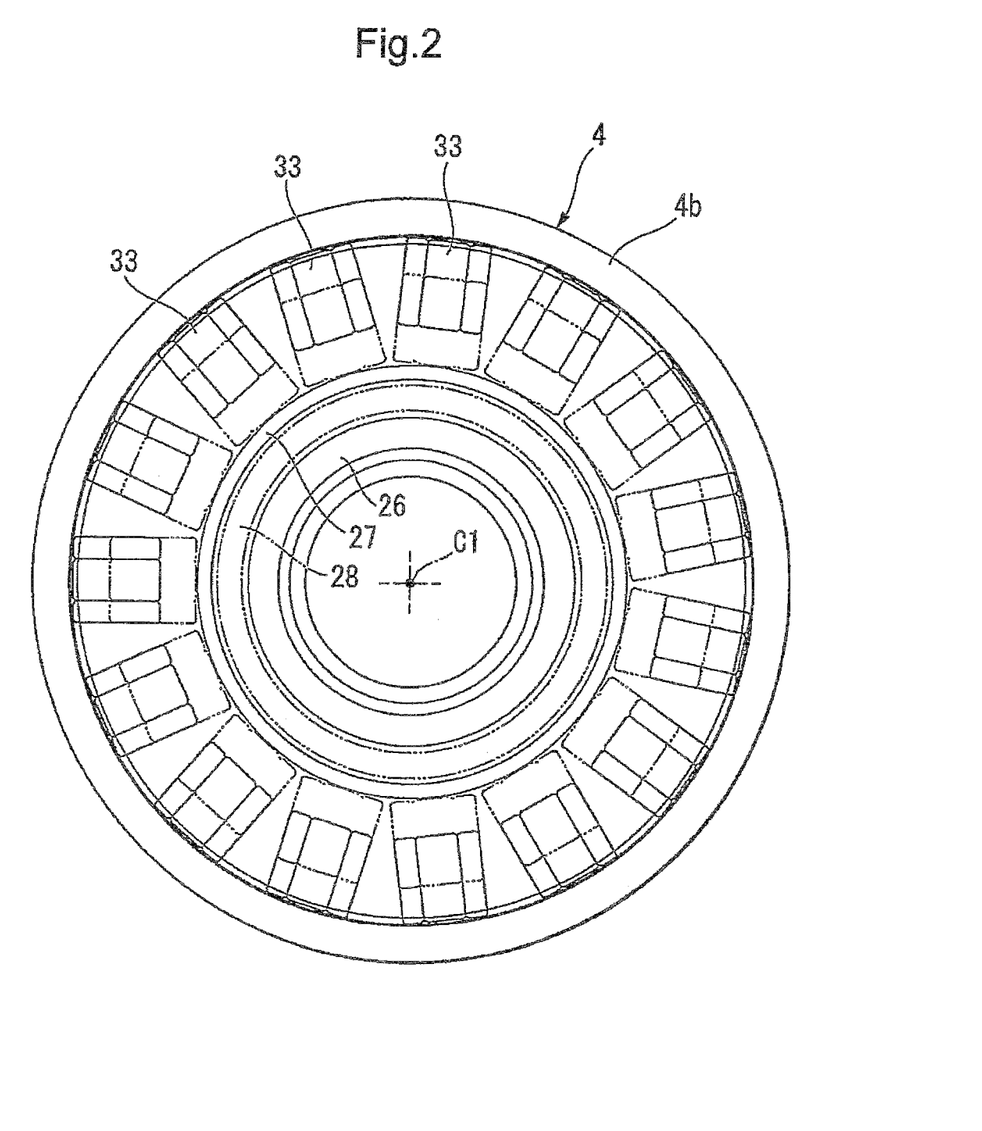
FIG. 2 is an arrow view of the clutch outer of the multiple disc clutch seen from the axial direction shown in FIG. 1.

Also, with reference to FIG. 2, each centrifugal weight 33 forms a cylindrical shape. The axis thereof is arranged along the tangential line in the circumferential direction of clutch. Each centrifugal weight 33 is movably retained by partition walls and the like, for example, standing up from the guide member 32 along the inclined surface 31 so as to be parallel to the radial direction of clutch. In addition, each centrifugal weight 33 made of different materials for the both sides thereof in the axial direction (the part abutting on the outer peripheral portion 4b of the clutch outer 4) and the middle thereof in the axial direction (the part abutting on the outer cylinder portion 27).

Figure 3:
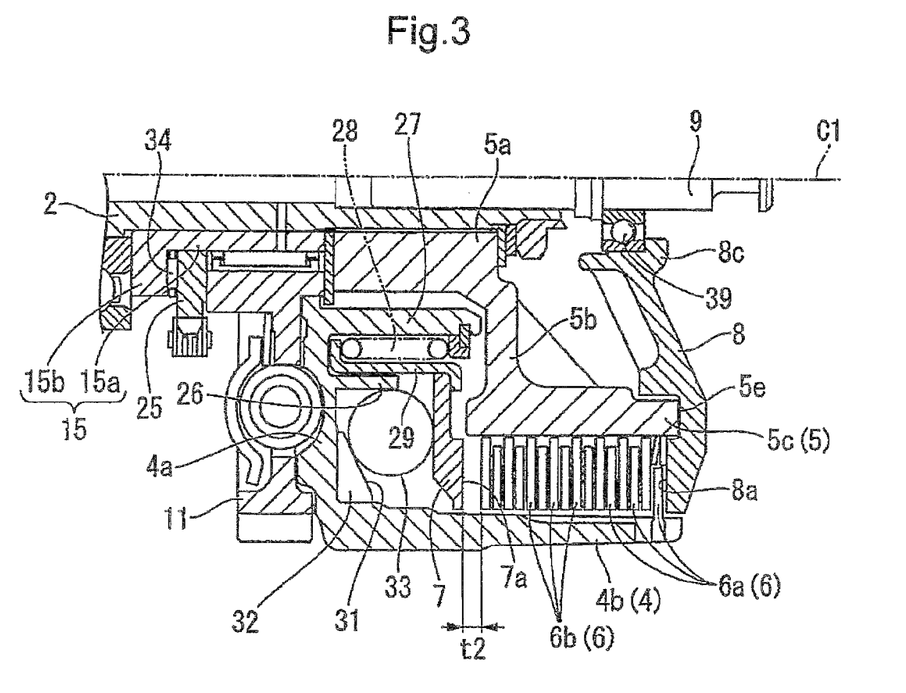
FIG. 3 is a cross sectional view corresponding to a part of FIG. 1, which shows a disconnection state of the multiple disc clutch.

With reference to FIG. 3, when the centrifugal force more than a predetermined value is not working on each centrifugal weight 33 (when the clutch is in low revolution), each centrifugal weight 33 moves to the inner periphery side along the inclined surface 31 by being thrust to the left side by the bottom portion side pressure plate 7 to the left side. Each centrifugal weight 33 is completely moved to the inner periphery side of the clutch by being abutted on the outer cylinder portion 27 from the outer periphery side.

At the time, the bottom side pressure plate 7 is completely moved to the left side, the thrusting force of the group of clutch plates 6 by the bottom side pressure plate 7 is released. Simultaneously, due to the fact that the open side pressure plate 8 abuts on a right end of the cylindrical portion 5c of the clutch inner 5 (the right end 5e of cylindrical portion) from the right side, the movement thereof to the left side is limited (the movement thereof to the left side is finished).

Meanwhile, with reference to FIG. 1, when the centrifugal force more than a predetermined value is working on each centrifugal weight 33 (when the clutch is in high revolution), each centrifugal weight 33 thrust the bottom side pressure plate 7 to the right side while moving to the outer periphery side along the inclined surface 31. Each centrifugal weight 33 is completely moved to the outer periphery side of clutch by abutting on the outer peripheral portion 4b from the inner periphery side.

At the time, the bottom side pressure plate 7 is completely moved to the right side, the bottom side pressure plate 7 thrusts the group of clutch plates 6. Simultaneously, the open side pressure plate 8 is thrust to the right side through the group of clutch plates 6, and the open side pressure plate 8 is spaced apart from the clutch inner 5. A clearance between the open side pressure plate 8 and the right end 5e of the cylinder portion of the clutch inner 5 is shown as a sign t1 in the drawings.

Accordingly, the open side pressure plate 8 thrusts the group of clutch plates 6 to the left side by being subjected to the elastic force of the clutch spring 36, then the group of clutch plates 6 are nipped and compressed by the elastic force of the clutch spring 36 between the respective pressure plates 7 and 8, the group of clutch plates 6 are integrally and frictionally engaged, the torque transmission can be possible between the clutch outer 4 and clutch inner 5.

At the time, a reaction force to the left side works on the clutch outer 4 due to the fact that the each centrifugal weight 33 thrusts the bottom side pressure plate 7 and the like. The reaction force is entered to the flange portion 15b of the collar member 15 through the hub portion 11a of the primary driven gear 11 and the sprocket 25 as well as the thrust bearing 34. Simultaneously, due to the fact that the sprocket 25 integrally rotating with the clutch outer 4 and the flange portion 15b which is a position limit member of the clutch outer 4 is allowed relatively rotating by the thrust bearing 34, the thrusting force is efficiently supported.

With reference to FIG. 1, the spring abutting portion 8b which is a cylindrical shape with a bottom and is open to the right side is formed on the middle portion in the radial direction of clutch of the open side pressure plate 8. The clutch spring 36 as a nip and compression coil spring is contained inside the spring abutting portion 8b.

The spring abutting portion 8b is provided so as to project from the open side pressure plate 8 to the left side. Inside of the spring abutting portion 8b, the boss portion 5d penetrating the bottom portion of the spring abutting portion 8b gets into while standing up from the flange portion 5b of the clutch inner 5 to the right side, simultaneously, the clutch spring 36 is provided on the outer periphery of the boss portion 5d. As for the clutch spring 36, the left edge portion thereof abuts (engages) from the right side on the bottom portion of the spring abutting portion 8b, simultaneously, the right end portion thereof abuts (engages) from the left side on a plain washer 37 fixed on the boss portion 5d by fastening with a bolt 38. The open side pressure plate 8 is biased to the left side (group of clutch plates 6 side) against the clutch inner 5 by the elastic force of the clutch spring 36. In addition, the spring abutting portion 8b and clutch spring 36 and the like are plurally provided at regular intervals in the circumferential direction of clutch.

The left side portion of the coaxial lifter rod 9 forming a rod-shaped is inserted and retained so as to be movable in the clutch axial direction inside the right end portion of the main shaft 2. As for the lifter rod 9, the right end portion 9a is engaged with the working end of the release structure 3b constructed on the engine case 3, simultaneously, the radial ball bearing 39 is supported on the outer periphery in the middle portion in the axial direction. The bearing 39 is retained on the inner periphery of the hub portion 8c of the open side pressure plate 8. The right side surface of the outer race of the bearing 39 abuts (engages) from the left side on the right end portion of the hub portion 8c of the open side pressure plate 8. The left side surface of the inner race of the bearing 39 abuts (engages) from the right side on the annular convex portion 9b formed on the middle portion in the axial direction of the lifter rod 9.

When the clutch disconnection operation is done by the clutch operator, the lifter rod 9 and the open side pressure plate moves to the right side by the operation of the release structure 3b. At the time, the multiple disc clutch 1 is in a disconnection state regardless of a radial direction of clutch position of each centrifugal weight 33 (regardless of the rotational speed of the clutch outer 4).

In the above-mentioned structure, even though the rotational driving force from the crank shaft is transmitted to the clutch outer 4 by the operation of the engine, if the rotational number (rotational speed) is under a predetermined value (low revolution), each centrifugal weight 33 is thrust to the bottom portion 4a by the bottom side pressure plate 7, and is still retained on the inner periphery side.

At the time, as shown in FIG. 3, a predetermined clearance t2 is formed in the clutch axial direction between the left thrust surface 7a of the bottom side pressure plate 7 and the left side surface of the group of clutch plates 6. Accordingly, the nip and compress (frictional engagement) of the group of clutch plates 6 is released, the torque transmission between the clutch outer 4 and the clutch inner 5 becomes incapable in a clutch disconnection state.

Meanwhile, as shown in FIG. 1, when the rotational number of the clutch outer 4 is increased more than the predetermined value (high revolution) from the above-mentioned state, each centrifugal weight 33 is moved to the outer periphery side against the thrusting force from the bottom side pressure plate 7, and moves the bottom side pressure plate 7 to the right side along the inclined surface 31.

When each centrifugal weight 33 is completely moved by abutting on the outer peripheral portion 4b of the clutch outer 4, the amount of movement to the right side of the bottom side pressure plate 7 is set larger than the clearance t2. Accordingly, when each centrifugal weight 33 is completely moved to the outer periphery side, each centrifugal weight 33 moves the open side pressure plate 8 to the right side through the group of clutch plates 6 in addition to the bottom side pressure plate 7.

When the open side pressure plate 8 is moved to the right side and is spaced apart from the right end 5e of the cylinder portion of the clutch inner 5, the elastic force of the clutch spring 36 works on the group of clutch plates 6 through the open side pressure plate 8. Accordingly, the group of clutch plates 6 are nipped and compressed and frictionally engaged by the elastic force of the clutch spring 36 between each pressure plate 7 and pressure plate 8, the torque transmission between the clutch outer 4 and the clutch inner 5 becomes capable in a clutch connection state.

Moreover, in the clutch connection state, when the clutch disconnection operation is done by the clutch operator, the lifter rod 9 and the open side pressure plate 8 moves to the right side by the operation of the release structure 3b. Accordingly, the open side pressure plate 8 is spaced apart from the right side surface of the group of clutch plates 6, the nip and compression (frictional engagement) of the group of clutch plates 6 by each pressure plate 7 and pressure plate 8 are released, the torque transmission between the clutch outer 4 and the clutch inner 5 becomes incapable in the clutch disconnection state.

Moreover, during the clutch disconnection operation, an operation force based on the elastic force of the clutch spring 36 is given to the clutch operator. Moreover, when the clutch outer 4 is in low revolution, regardless of the operation by the clutch operator, the clutch becomes disengaged. At the time, the operation force based on the elastic force of the clutch spring 36 is given to the clutch operator.

As mentioned above, in the one having a function as a centrifugal clutch which switches the torque transmission wherein each clutch plate 6 is thrust in the clutch axial direction or releases the thrusting force by the movement of the centrifugal weight 33 to the radial direction of the clutch, the multiple disc clutch 1 in the first embodiment has the clutch outer 4 which is concentrically formed with the main shaft 2 and formed in a cylindrical shape with a bottom, simultaneously, which is relatively and rotatably supported on the main shaft 2 and is constantly subjected to the driving force from the driving source; the clutch inner 5 integrally and rotatably supported on the main shaft 2 in the inner periphery side of the clutch outer 4; a first clutch plate 6 (clutch disc 6a) integrally and rotatably supported in the inner periphery side of the clutch outer 4; the second clutch plate 6 (clutch disc 6b) integrally and rotatably supported in the outer periphery side of the clutch inner 5, the bottom portion side pressure plate 7 which is arranged in the inner periphery side as well as the bottom portion 4a side of the clutch outer 4 and sandwiches the centrifugal weight 33 between the space to the bottom portion 4a of the clutch outer 4, simultaneously, thrusts each clutch plate 6 to the open side of the clutch outer 4 and releases the thrusting force by the movement of the centrifugal weight 33 to the radial direction of the clutch, the open side pressure plate 8 which is arranged in the inner periphery side as well as the open side of the clutch outer 4 and thrusts each clutch plate 6 to the bottom portion 4a of the clutch outer 4 by being subjected to the thrusting force from the centrifugal weight 33, the open side pressure plate 8 is supported on the clutch inner 5.

According to the structure, due to the fact that the open side pressure plate 8 subjected to the thrusting force from the centrifugal weight 33 is supported on the clutch inner 5, the clutch outer 4 and then the multiple disc clutch 1 can reduce the bulk and can be downsized.

Moreover, the multiple disc clutch 1 has the flange portion 15b abutting on the bottom portion 4a in the clutch axial direction in order to limit the movement of the clutch outer 4 itself to the bottom portion 4a side, the thrust bearing 34 is arranged between the flange portion 15b and the bottom portion 4a.

According to the structure, due to the reaction force generated when the centrifugal weight 33 thrusts the bottom portion side pressure plate 7 supported on the clutch inner 5, the clutch outer 4 is subjected to the load in the clutch axial direction. However, due to the fact that the thrust bearing 34 subjected to the load allows the clutch outer 4 and the flange portion 15b relatively rotating, the load can be efficiently subjected.

Moreover, due to the fact that the sprocket 25 for the auxiliary drive is arranged between the flange portion 15b and the bottom portion 4a, the above-mentioned multiple disc clutch 1 can secure the contact surface of the thrust bearing 34 by using the side surface of the sprocket 25.

Moreover, due to the fact that the above-mentioned multiple disc clutch 1 has the spring 28 biasing the bottom portion side pressure member 7 to the bottom portion 4a and the spring 28 is arranged between the centrifugal weight 33 and the hub portion 5a of the clutch inner 5 in the radial direction of clutch, the spring 28 can efficiently be arranged between the centrifugal weight 33 and the hub portion 5a, simultaneously, the clutch capacity can be secured without reducing the numbers of centrifugal weight 33.

Moreover, due to the fact that the clutch spring 36 biasing the open side pressure plate 8 to the bottom portion 4a side is equipped, when the open side pressure plate 8 is moved to the open side of the clutch outer 4 by being subjected to the thrusting force from the centrifugal weight 33, the above-mentioned multiple disc clutch 1 can sandwich each clutch plate 6 with each pressure plate 7 and pressure plate 8 by the elastic force of the clutch spring 36.

<The Second Embodiment>

Next, the second embodiment of the present invention will be explained with reference to FIG. 4 to 8.

Figure 4:
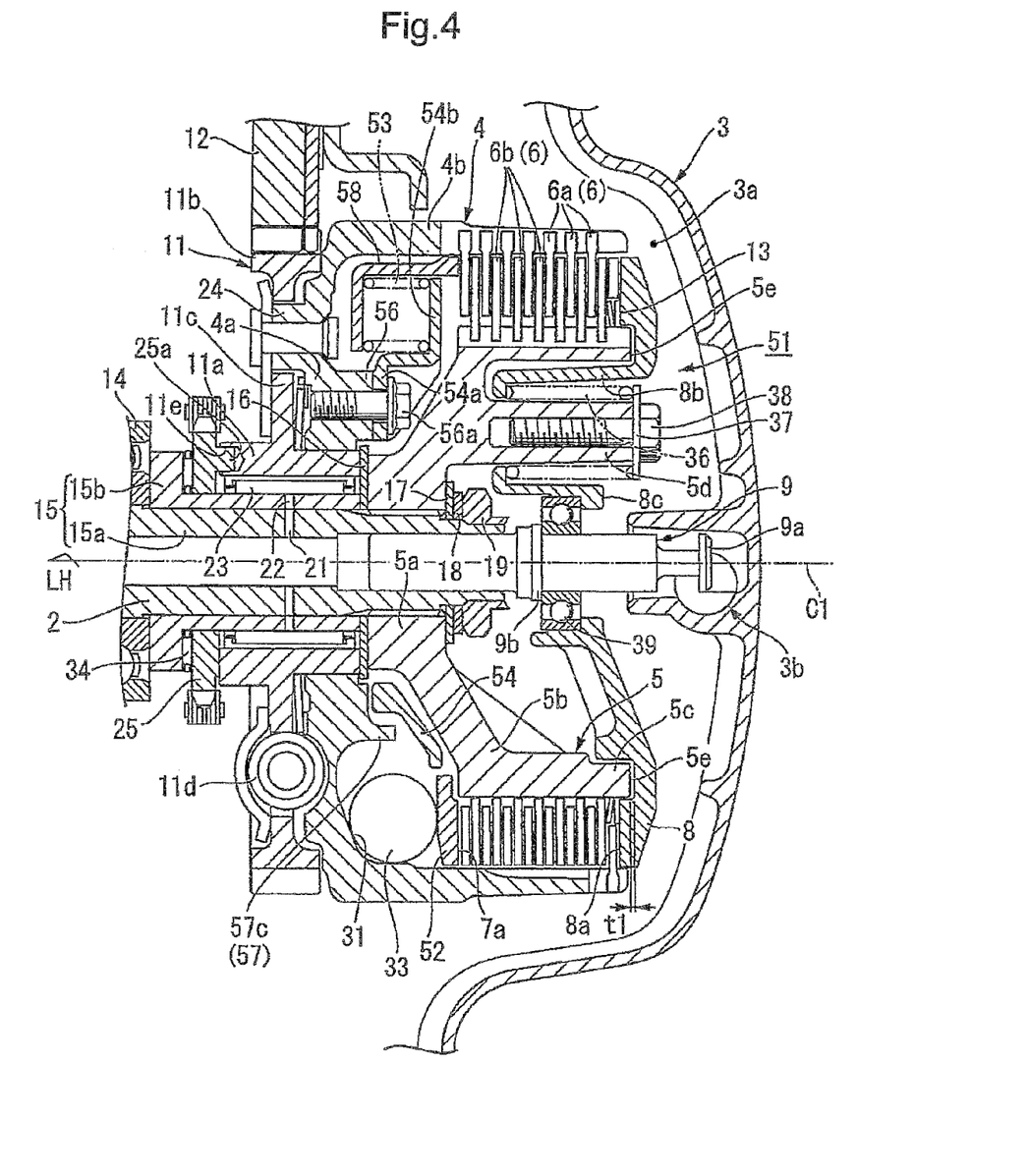
FIG. 4 is a cross sectional view along the axial direction, which shows a connection state of a multiple disc clutch in the second embodiment of the present invention.

The second embodiment is mainly different from the first embodiment in the point that the second embodiment has a spring 53 arranged between the centrifugal weights 33 instead of the springs 28. The other parts which are same as the parts of the first embodiment are given the same reference numerals and signs, and the explanation thereof is omitted.

A multiple disc clutch 51 shown in FIG. 4 has the clutch outer 4, the clutch inner 5, each clutch plate 6, the open side pressure plate 8, and the lifter rod 9, which are same as the ones in the first embodiment, simultaneously has a bottom side pressure plate 52 concentrically arranged on the inner periphery side as well as on the bottom portion 4a side of the clutch outer 4 and thrusting the group of clutch plates 6 to the right side, the nip and compression coil spring 53 giving the bottom side pressure plate 52 the biasing force to the left side, a retainer 54 spring subjected to the reaction force from the spring 53.

Figure 6:
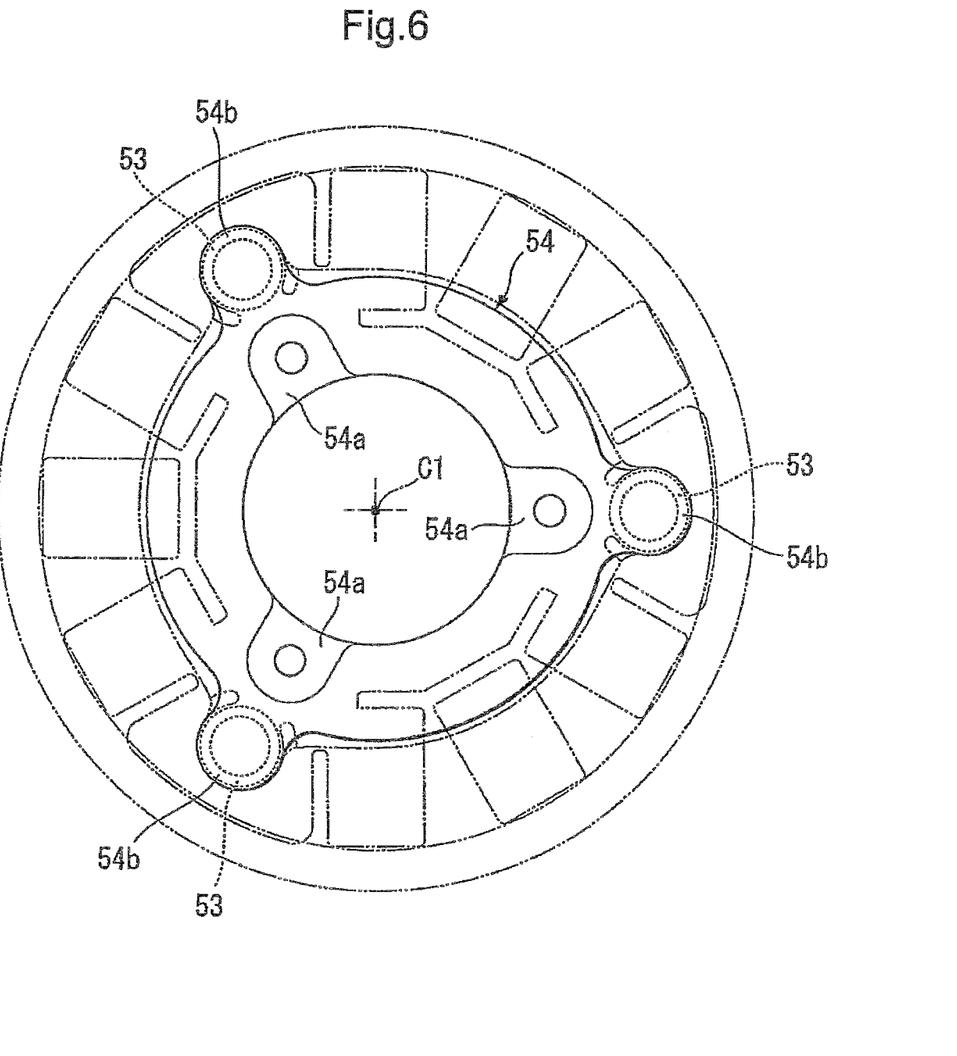
FIG. 6 is an arrow view of the retainer of the multiple disc clutch shown in FIG. 4 seen from the axial direction.
Figure 7:
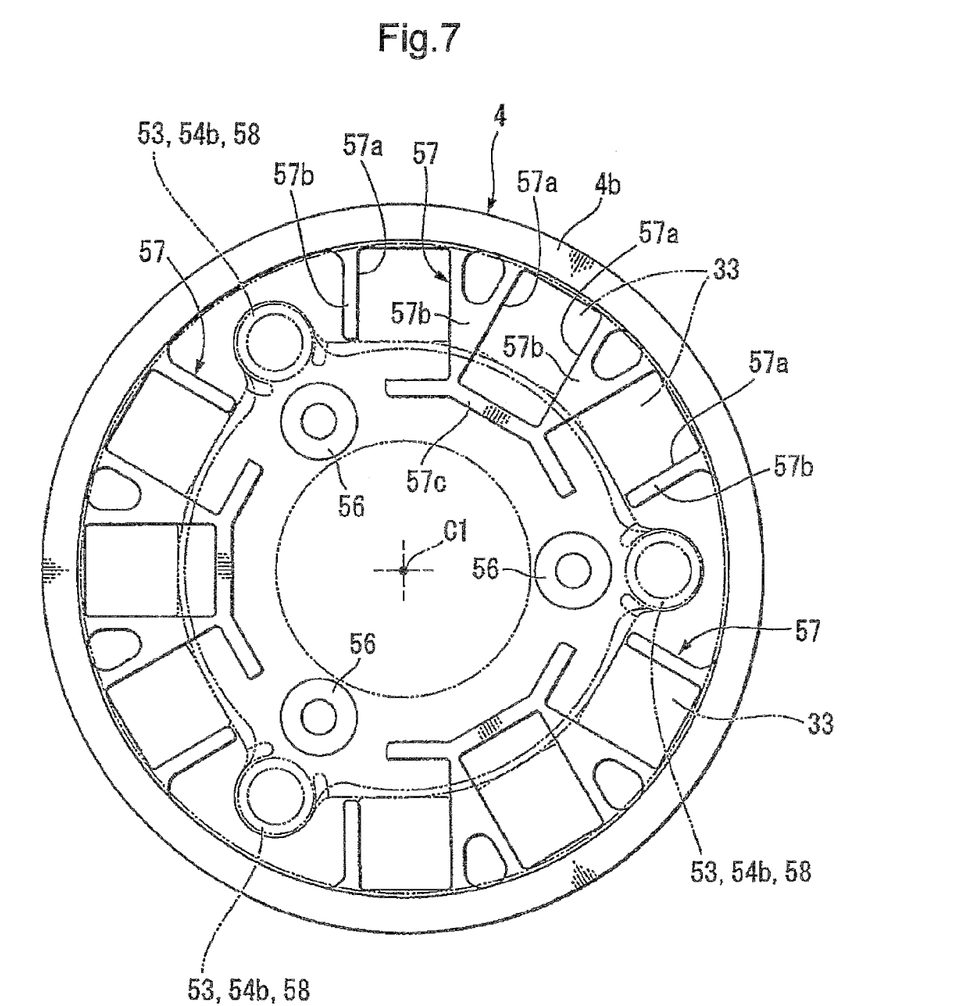
FIG. 7 is an arrow view of the clutch outer of the multiple disc clutch shown in FIG. 4 seen from the axial direction.

With reference to FIG. 6 and 7, boss portions 56 and a holding wall 57 standing up to the right side are respectively provided on the right side surface of the bottom portion 4a of the clutch outer 4. The (three of) boss portions 56 are plurally provided at regular intervals in the circumferential direction of clutch, (Three of) fastening portions 54a plurally formed on the retainer 54 at regular intervals in the circumferential direction of the clutch are fixed by fastening with bolts 56a on each boss portion 56. A support portion 54b supporting the right end of the spring 53 (subjected to the reaction force) formed on the outer periphery of each fastening portion 54a of retainer 54 respectively.

With reference to FIG. 7, the holding wall 57 are respectively formed between the respective boss portions 56 of the bottom portion 4a. A plural (three) of centrifugal weight 33 is movably retained on the one of the holding wall 57 in a radial direction of clutch.

Figure 8:
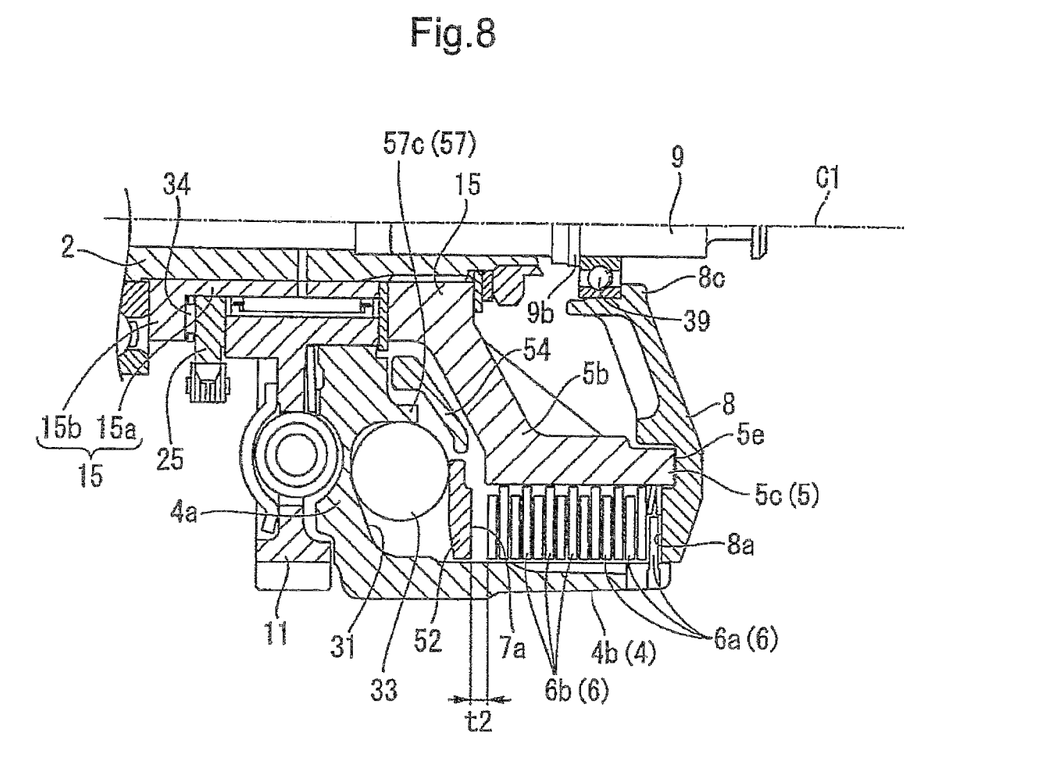
FIG. 8 is a cross sectional view corresponding to a part in FIG. 4, which shows a disconnection state of the multiple disc clutch shown in FIG. 4.

Each holding wall 57 has a partition wall 57b forming a move guide surface 57a along the edge of the axial direction of each centrifugal weight 33, an inner limiting wall 57c determining the limit position of movement to the inner periphery side by abutting each centrifugal weight 33 (See FIG. 8). In addition, the limit position of movement to the outer periphery of each centrifugal weight 33 is determined by abutting each centrifugal weight 33 on the outer peripheral portion 4b of the clutch outer 4.

Figure 5:
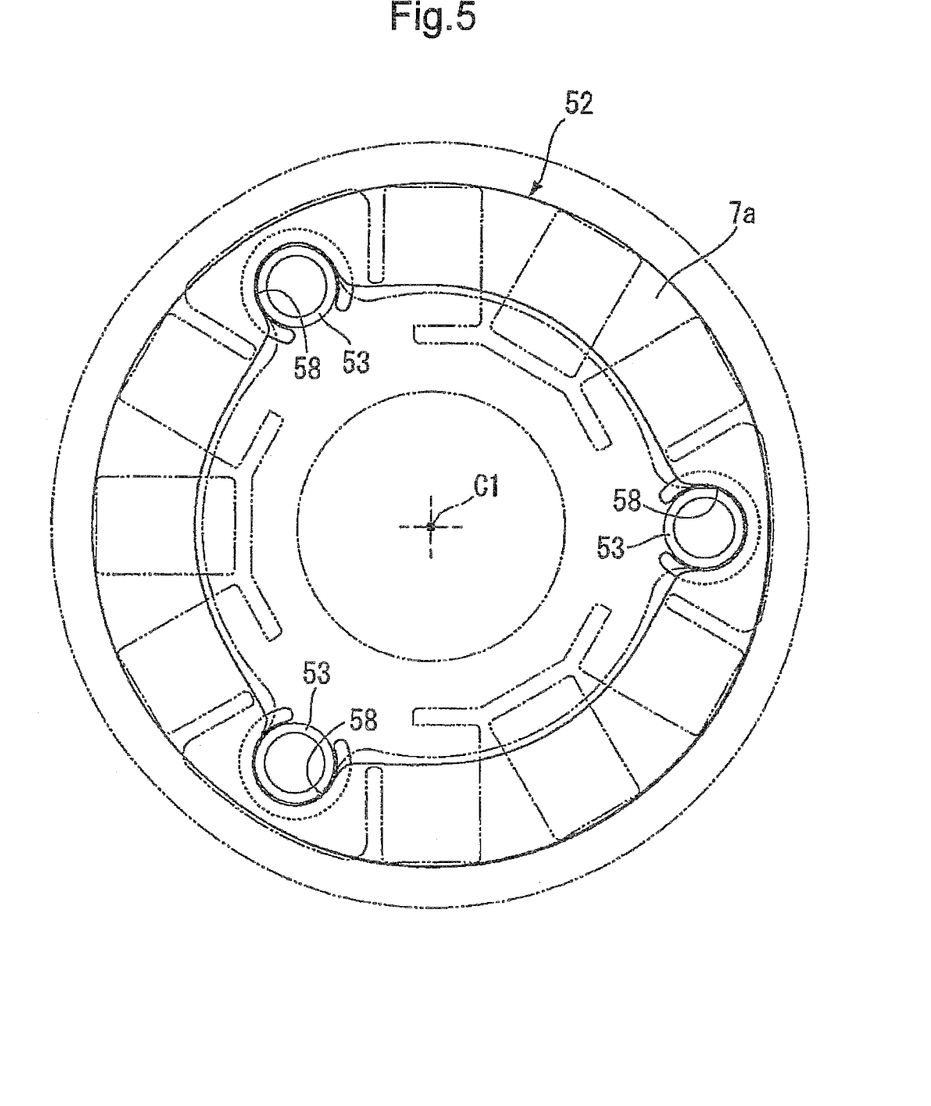
FIG. 5 is an arrow view of the bottom side pressure plate of the multiple disc clutch shown in FIG. 4 seen from the axial direction.

With reference to FIG. 4 to 5, the bottom side pressure plate 52 has a discoid shape with a central hole and is provided so as to position on the further outer periphery side than the retainer 54 when viewed in the clutch axial direction. The spring abutting portion 58 containing spring 53 respectively are formed on the part positioned in the outer periphery side of each boss portion 56 and fastening portion 54a in the bottom side pressure plate 52.

Each spring abutting portion 58 has a cylindrical shape with a bottom and is open to the right side and is provided so as to project from the bottom side pressure plate 52 to left side. Each support portion 54b of the retainer 54 is respectively arranged on the open side (right side) of each spring abutting portion 58. Each spring 53 is retained in a shorten state between each support portion 54b and the bottom portions of each spring abutting portion 58.

By the elastic force of each nip and compression coil spring 53, the bottom portion side pressure plate 52 is biased to the left side (the opposite side of the group of clutch plates 6). The bottom side pressure plate 52 is integrally rotatable with the clutch outer 4, by being engaged so as to be relatively incapable of rotating with the bottom portion 4a of the clutch outer 4 through the retainer 54.

With reference to FIG. 4 and 7, as for the multiple disc clutch 51, due to the fact that the outer periphery side of the bottom portion 4a is protruded without using the guide member 32, the inclined surface 31 is formed, which inclined so as to be positioned in the further right side at the corner portion of the clutch outer 4 as it goes to the outer periphery. A plurality of centrifugal weight 33 is arranged at a predetermined position so as to be lined in the circumferential direction of clutch in the space surrounded by the outer peripheral portion 4b in the inner periphery side of the clutch outer 4 as well as in the bottom portion 4a side, the inner limiting wall 57c of the partition wall 57b, the bottom portion 4a, and the bottom side pressure plate 52. Each spring 53, each spring abutting portion 58, and each support portion 54b are arranged at a predetermined position between a part of the respective centrifugal weights 33 (between the adjacent partition wall 57b).

As mentioned above, as for the multiple disc clutch 51 in the above-mentioned embodiment, as same as the multiple disc clutch 1 of the first embodiment, the spring 53 is downsized and the multiple disc clutch 51 can be further downsized due to the fact that the multiple disc clutch 51 is downsized, simultaneously, is efficiently subjected to the thrusting force of the clutch outer 4, moreover, and has the spring 53 biasing the bottom portion side pressure plate 52 to the bottom portion 4a side, the spring 53 is arranged between a plurality of the centrifugal weights 33 which are lined in the circumferential direction of clutch.

It will be obvious that the present invention is not limited within the above-mentioned embodiments and various changes can be made without departing from the scope of the invention. Obviously, numerous modifications and variations of the present invention are possible in light of the above teachings. It is therefore to be understood that within the scope of the appended claims, the invention may be practiced otherwise than as specifically described herein.

What is claimed is:

1. A centrifugal clutch system comprising:
a centrifugal weight movable in an inward radial direction of the clutch system and an outward radial direction of the clutch system;
an outer member having an axis coaxial with a rotation axis and having a cylindrical shape with a bottom portion, the outer member being relatively rotatably supported on the rotation axis and being constantly subjected to a driving force from a driving source;
an inner member integrally and rotatably supported on the rotation axis in an inner periphery side of said outer member;
a first clutch plate integrally and rotatably supported in the inner periphery side of said outer member;
a second clutch plate integrally and rotatably supported in an outer periphery side of said inner member;
a first pressure member arranged on the inner periphery side and on a bottom portion side of said outer member, said centrifugal weight is sandwiched between said first pressure member and said bottom portion of said outer member such that said centrifugal weight applies a thrusting force to each clutch plate to an open side of said outer member by movement of said centrifugal weight in the outward radial direction and releases the thrusting force by movement of said centrifugal weight in the inward radial direction;
a second pressure member arranged on the inner periphery side and on the open side of said outer member and thrusts each clutch plate to said bottom portion side of said outer member when being subjected to the thrusting force from said centrifugal weight, and said second pressure member is supported on said inner member;
a move limiting portion configured to limit a movement of said outer member to said bottom portion side in a clutch axial direction; and
a thrust bearing arranged between the move limiting portion and said bottom portion of said outer member.

2. The centrifugal clutch system according to claim 1, wherein a sprocket for an auxiliary drive is arranged between said move limiting portion and said bottom portion.

3. The centrifugal clutch system according to claim 1, further comprising a biasing member configured to bias the first pressure member to said bottom portion, wherein the biasing member is arranged between a plurality of the centrifugal weights that are lined in a circumferential direction of the clutch system.

4. The centrifugal clutch system according to claim 1, further comprising a clutch spring configured to bias said second pressure member to said bottom portion side.

5. The centrifugal clutch system according to claim 1, further comprising a lifter rod that is engaged with a release structure interlocked with a clutch operator and releases a thrusting force generated by the second pressure member to each clutch plate.

6. The centrifugal clutch system according to claim 1, wherein a plurality of engaging pawls are projected on an outer periphery of the second clutch plate and are supported by a plurality of engaging grooves engraved on the outer peripheral portion of the outer member.

7. The centrifugal clutch system according to claim 1, wherein a plurality of engaging pawls are projected on an inner periphery of the first clutch plate and are supported by a plurality of engaging grooves on a cylindrical portion of the inner member.

8. The centrifugal clutch system according to claim 1, wherein the first clutch plate has a friction material on both faces of a base plate of the first clutch plate.

9. The centrifugal clutch system according to claim 1, wherein the second clutch plate is made of a single metallic sheet.

10. The centrifugal clutch system according to claim 1, further comprising a main shaft provide along the rotation axis, wherein the main shaft is formed in a hollow state and an inside of the main shaft is used for an oil passage of engine oil.

11. The centrifugal clutch system according to claim 1, further comprising a main shaft provide along the rotation axis and a collar member inserted by the main shaft, wherein the collar member includes a collar body and a collar flange, the collar flange includes the move limiting portion, and the collar body abuts a hub portion of the inner member at a first end of the collar body that is closer to said open side than a second end of the collar body.

12. The centrifugal clutch system according to claim 11, further comprising a radial ball bearing to support the main shaft at a second end of the collar member that is closer to said bottom portion side than a second end of the collar member, and a lock nut provided around the main shaft at a first end portion of the main shaft that is closer to said open side than a second end portion of the main shaft, wherein the lock nut, the collar member, the hub portion of the inner member and the radial ball bearing are integrally fixed.

13. The centrifugal clutch system according to claim 11, wherein an oil hole corresponding to an oil hole provided in the main shaft is formed in the collar body.

14. The centrifugal clutch system according to claim 11, further comprising a primary driven gear to enable a power transmission of the driving force and a needle bearing provided on an outer periphery of the collar body, wherein the primary driven gear is integrally and rotatably installed on the bottom portion of the outer member, and wherein a hub portion of the primary driven gear is rotatably supported on the outer periphery of the collar body through the needle bearing.

15. The centrifugal clutch system according to claim 1, further comprising a primary driven gear to enable a power transmission of the driving force, wherein the primary driven gear is integrally and rotatably installed on the bottom portion of the outer member.

16. The centrifugal clutch system according to claim 1, further comprising a guide member fixedly installed on a corner portion of the bottom portion of the outer member and an outer peripheral portion of the outer member, wherein said guide member has an inclined surface.

17. The centrifugal clutch system according to claim 1, wherein the centrifugal weight has a cylindrical shape and an axis of the cylindrical shape is arranged along a tangential line in a circumferential direction of the clutch system.

18. A centrifugal clutch system comprising:
a centrifugal weight movable in an inward radial direction of the clutch system and an outward radial direction of the clutch system;
an outer member having an axis coaxial with a rotation axis and having a cylindrical shape with a bottom portion, the outer member being relatively rotatably supported on the rotation axis and being constantly subjected to a driving force from a driving source;
an inner member integrally and rotatably supported on the rotation axis in an inner periphery side of said outer member;
a first clutch plate integrally and rotatably supported in the inner periphery side of said outer member;
a second clutch plate integrally and rotatably supported in an outer periphery side of said inner member;
a first pressure member arranged on the inner periphery side and on a bottom portion side of said outer member, said centrifugal weight is sandwiched between said first pressure member and said bottom portion of said outer member such that said centrifugal weight applies a thrusting force to each clutch plate to an open side of said outer member by movement of said centrifugal weight in the outward radial direction and releases the thrusting force by movement of said centrifugal weight in the inward radial direction;
a second pressure member arranged on the inner periphery side and on the open side of said outer member and thrusts each clutch plate to said bottom portion of said outer member when being subjected to the thrusting force from said centrifugal weight, and said second pressure member is supported on said inner member; and
a biasing member configured to bias said first pressure member to said bottom portion side, wherein the biasing member is arranged between said centrifugal weight and a hub portion of said inner member in the radial direction of clutch system.

19. A centrifugal clutch system comprising:
a centrifugal weight movable in an inward radial direction of the clutch system and an outward radial direction of the clutch system;
an outer member having an axis coaxial with a rotation axis and having a cylindrical shape with a bottom portion, the outer member being relatively rotatably supported on the rotation axis and being constantly subjected to a driving force from a driving source;
an inner member integrally and rotatably supported on the rotation axis in an inner periphery side of said outer member;
a first clutch plate integrally and rotatably supported in the inner periphery side of said outer member;
a second clutch plate integrally and rotatably supported in an outer periphery side of said inner member;
a first pressure member arranged on the inner periphery side and on a bottom portion side of said outer member, said centrifugal weight is sandwiched between said first pressure member and said bottom portion of said outer member such that said centrifugal weight applies a thrusting force to each clutch plate to an open side of said outer member by movement of said centrifugal weight in the outward radial direction and releases the thrusting force by movement of said centrifugal weight in the inward radial direction;

a second pressure member arranged on the inner periphery side and on the open side of said outer member and thrusts each clutch plate to said bottom portion of said outer member when being subjected to the thrusting force from said centrifugal weight, and said second pressure member is supported on said inner member; and a belleville spring arranged at an inner periphery side of a clutch plate closest to the open side of the outer member the first and second clutch plates.

* * * * *